US011199212B2

(12) United States Patent
Kennair, Jr.

(10) Patent No.: US 11,199,212 B2
(45) Date of Patent: Dec. 14, 2021

(54) TACTICAL-GEAR INTERCONNECTION SYSTEM APPARATUS AND METHOD

(71) Applicant: Donald Kennair, Jr., Belle Chasse, LA (US)

(72) Inventor: Donald Kennair, Jr., Belle Chasse, LA (US)

( * ) Notice: Subject to any disclaimer, the term of this patent is extended or adjusted under 35 U.S.C. 154(b) by 1050 days.

(21) Appl. No.: 15/827,198

(22) Filed: Nov. 30, 2017

(65) Prior Publication Data

US 2018/0156254 A1 Jun. 7, 2018

Related U.S. Application Data

(63) Continuation of application No. 15/007,431, filed on Jan. 27, 2016, now Pat. No. 9,869,332.

(51) Int. Cl.
*F16B 7/18* (2006.01)
*F41A 11/02* (2006.01)

(52) U.S. Cl.
CPC ............. *F16B 7/182* (2013.01); *F41A 11/02* (2013.01); *Y10T 403/56* (2015.01); *Y10T 403/5746* (2015.01); *Y10T 403/68* (2015.01)

(58) Field of Classification Search
CPC ............. Y10T 403/36; Y10T 403/3986; Y10T 403/56; Y10T 403/5746; Y10T 403/68; F16B 7/0453; F16B 7/182; F41A 11/00; F41A 11/02; F41A 11/04
See application file for complete search history.

(56) References Cited

U.S. PATENT DOCUMENTS

| | | |
|---|---|---|
| 6,524,025 B2 | 2/2003 | Chen |
| 6,637,538 B2 | 10/2003 | Morykon |
| 6,783,462 B1 | 8/2004 | Costain |
| 6,939,074 B2 | 9/2005 | Gethmann |
| 7,155,764 B2 | 1/2007 | Sawatzky |
| 8,726,582 B2 | 5/2014 | Hahin |
| 9,080,833 B1 | 7/2015 | Williford |
| 2007/0017139 A1 | 1/2007 | Larue |
| 2013/0263490 A1 | 10/2013 | Oliver |
| 2014/0373419 A1 | 12/2014 | Leclair |

*Primary Examiner* — Matthew R McMahon
(74) *Attorney, Agent, or Firm* — Keaty Law Firm LLC

(57) ABSTRACT

A tactical-gear interconnection system apparatus and method allowing connection of a variety of tactical gear such as gun stocks, camera supports, sights, rangefinders, grips, and clamps, in field-interchangeable configurations responsive to changes in field conditions, by providing same-sized threaded plug units on all gear and same-sized interchangeable unions for removable connection of various pieces of gear.

2 Claims, 5 Drawing Sheets

TACTICAL-GEAR INTERCONNECTION SYSTEM APPARATUS AND METHOD

CROSS-REFERENCE TO RELATED APPLICATIONS

This application is a continuation of my co-pending application Ser. No. 15/007,431, filed on Jan. 27, 2016 for a "TACTICAL-GEAR INTERCONNECTION SYSTEM APPARATUS AND METHOD," the full disclosure of which is incorporated by reference herein, and priority of which is hereby claimed.

BACKGROUND OF THE INVENTION

The present invention provides a tactical-gear interconnection system apparatus and method allowing for connection of a variety of tactical gear such as gun stocks, camera supports, sights and rangefinders, grips, and clamps, in field-interchangeable configurations.

Apart from the Picatinny-rail and earlier Weaver-rail standards, there exists no standard for removable connection among different pieces of tactical gear. The Picatinny-rail system is designed for mounting relatively small things onto a gun, and is not meant to withstand the considerable strain that results from connecting large or heavy pieces together, or from connecting the various pieces in such a way that the connection acts as a part of the supporting structure of the whole. When the Picatinny-rail system is pressed into service for making structural connections, it is subject to failure. Such failure in the field is, at best, undesirable, and at worst may be life-threatening.

In the field, people are called upon to make emergency repairs to tactical gear and to reconfigure gear in order to meet unexpected conditions. There is a need for a system of removable connections among various pieces of tactical gear that is standardized, with interchangeable parts; that is durable; and that is simple enough for the making and unmaking of connections to be done blindfolded or in otherwise challenging conditions.

SUMMARY OF THE INVENTION

The present invention is a tactical-gear interconnection system apparatus and method allowing connection of a variety of tactical gear in field-interchangeable configurations, responsive to changes in field conditions, by providing same-sized threaded plug units on all gear and same-sized interchangeable unions for removable connection of various pieces of gear.

This invention solves a problem with interconnection of tactical gear in the field, under field conditions, responsive to changing field conditions.

BRIEF DESCRIPTION OF DRAWINGS

Reference will now be made to the drawings, wherein like parts are designated by like numerals, and wherein:

FIG. 1A is a portion of the schematic view of the tactical-gear interconnection system, illustrating a plug unit secured to a scope;

FIG. 1B is a portion of the schematic view of the tactical-gear interconnection system, illustrating a plug unit secured to a camera mount;

FIG. 1C is a portion of the schematic view of the tactical-gear interconnection system, illustrating a plug unit secured to a Picatinny-type rail;

FIG. 1D is a portion of the schematic view of the tactical-gear interconnection system, illustrating a plug unit secured to a clamp;

FIG. 1E is a portion of the schematic view of the tactical-gear interconnection system, illustrating a detail exploded view of a union used in the system of the present invention;

FIG. 1F is a portion of the schematic view of the tactical-gear interconnection system, illustrating a plug unit secured to a stabilizing mount;

FIG. 1G is a portion of the schematic view of the tactical-gear interconnection system, illustrating a plug unit secured to opposite ends of a stabilizing mount;

FIG. 1H is a portion of the schematic view of the tactical-gear interconnection system, illustrating a plug unit secured to a tripod stabilizing mount;

FIG. 4A illustrates an exploded view of the tactical-gear interconnection system;

FIG. 4B illustrates a partially assembled view of the tactical-gear interconnection system;

FIG. 4C illustrates an assembled view of the tactical-gear interconnection system;

FIG. 6A illustrates an exploded view of the tactical-gear interconnection system with same-sized plug units;

FIG. 6B illustrates one of the plug units of the tactical-gear interconnection system having a smaller external diameter than the other plug unit;

FIG. 6C illustrates smaller diameter plug units of the tactical-gear interconnection system and correspondingly reduced size of the unit elements;

FIG. 6D illustrates a double-ended plug unit of the tactical-gear interconnection system with the ends of the plug unit being of the same size;

FIG. 6E illustrates a double-ended plug unit of the tactical-gear interconnection system with the ends of the plug unit being of varying diameter; and FIG. 6F illustrates a smaller double-ended plug unit of the tactical-gear interconnection system with the ends of the plug unit being of a correspondingly reduced size.

DETAILED DESCRIPTION OF THE INVENTION

Figure 1:
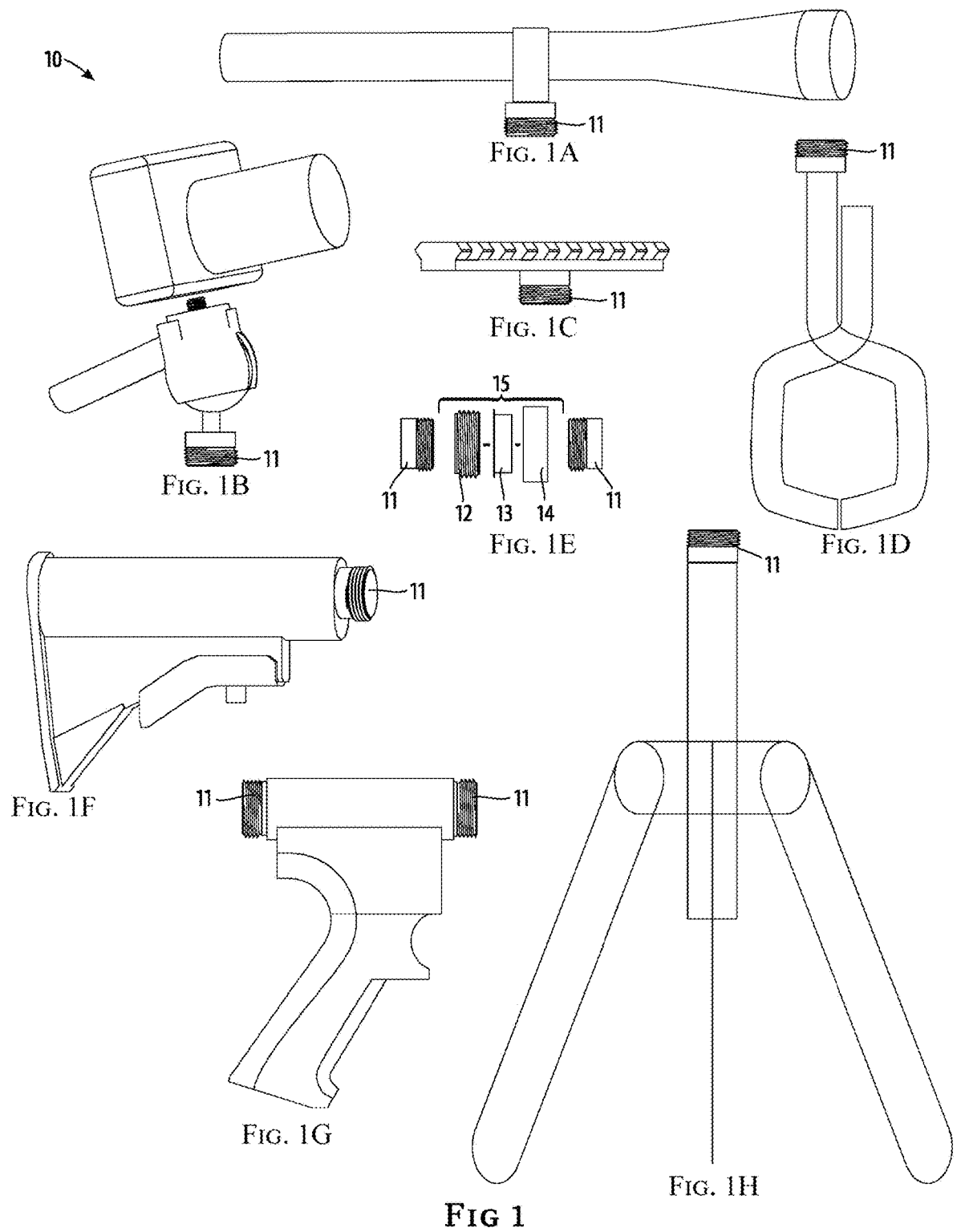
FIG. 1 is a schematic view of the tactical-gear interconnection system.

Referring to FIG. 1 and the other figures generally, the tactical-gear interconnection system method and apparatus 10 are shown schematically in use on a variety of tactical gear.

Same-sized plug units 11 are manufactured into or attached to a variety of tactical gear such as stocks, grips, tripods, clamps, sights, camera mounts, or mounting rails. Therefore the joining of any two pieces of gear will be a plug-to-plug, or male-to-male join. A union 15, comprising an internal-external threaded section 12, an internal-only threaded section 13, and an internally threaded collar 14, is provided to effect removable joinings of various pieces of gear. The plug units 11 and the unions 15 are all of a standardized size or a small number of standardized sizes, allowing any union 15 that is available in the field to make any connection needed, whether such a connection has been foreseen in training or has arisen from unique conditions.

The plug units 11 are chosen for affixing to the tactical gear because such plug units 11 are easier to manufacture or retrofit onto the gear, avoid having to create a cavity in the gear, and are generally more durable and easier to clean than sockets would be.

Figure 2:
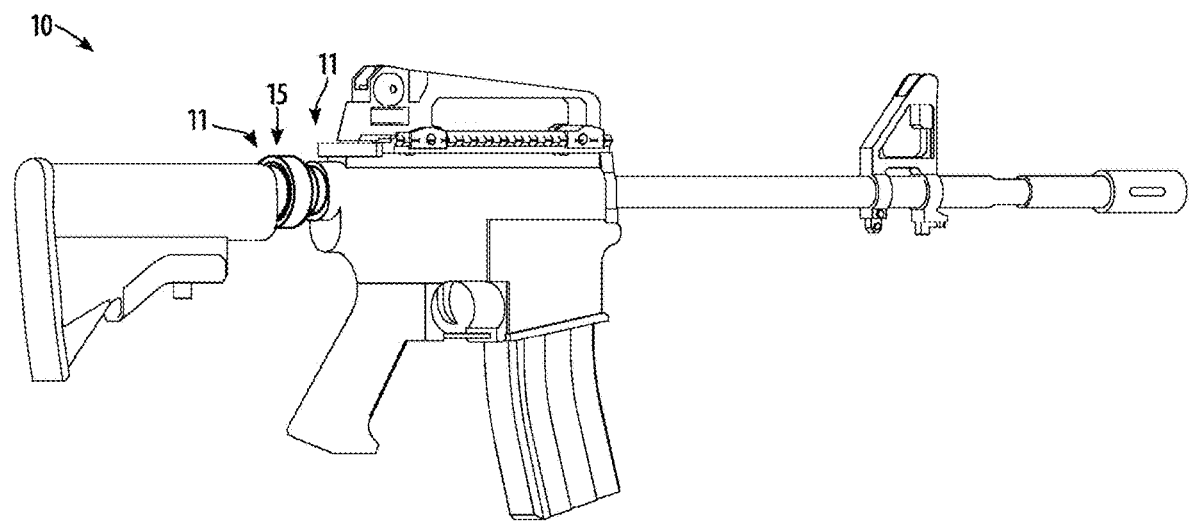
FIG. 2 is a view of an embodiment of the tactical-gear interconnection system in use on an automatic rifle.

FIG. 2 illustrates the use of the tactical-gear interconnection system in attaching an automatic rifle to a gun stock. The plug units 11 have been fixed to the rifle and the stock, either as part of the manufacture or as a retrofitting of the gear.

Figure 3:
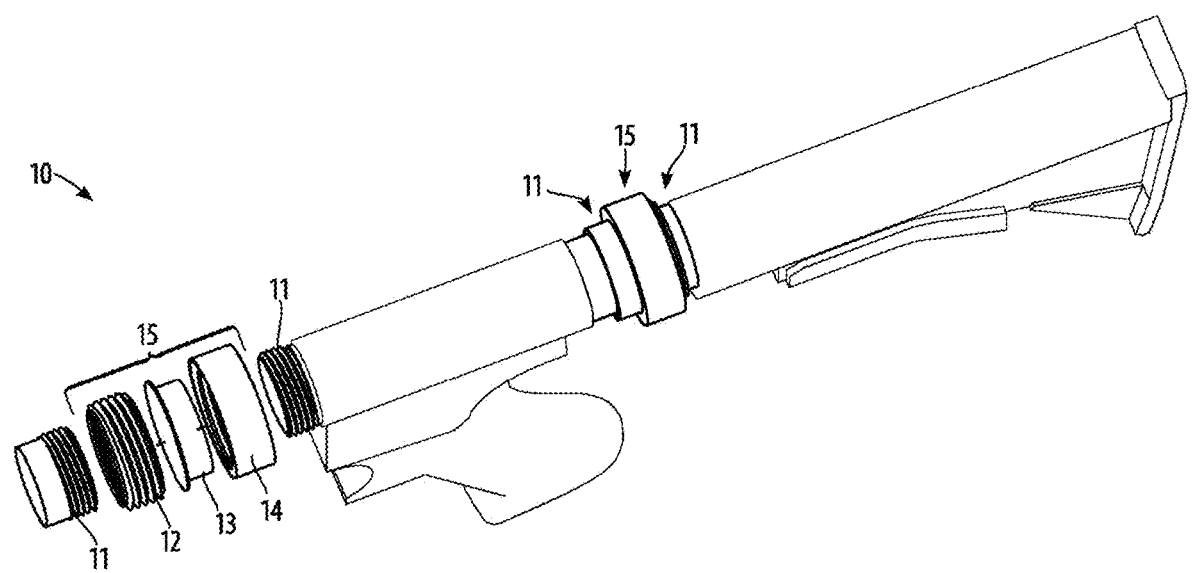
FIG. 3 is a view of an embodiment of the tactical-gear interconnection system in use on a stock and a grip.

FIG. 3 illustrates the use of two instances of the tactical-gear interconnection system in attaching a stock to the rear of a grip, with an exploded system at the front of the grip, ready for attachment.

Figure 4:
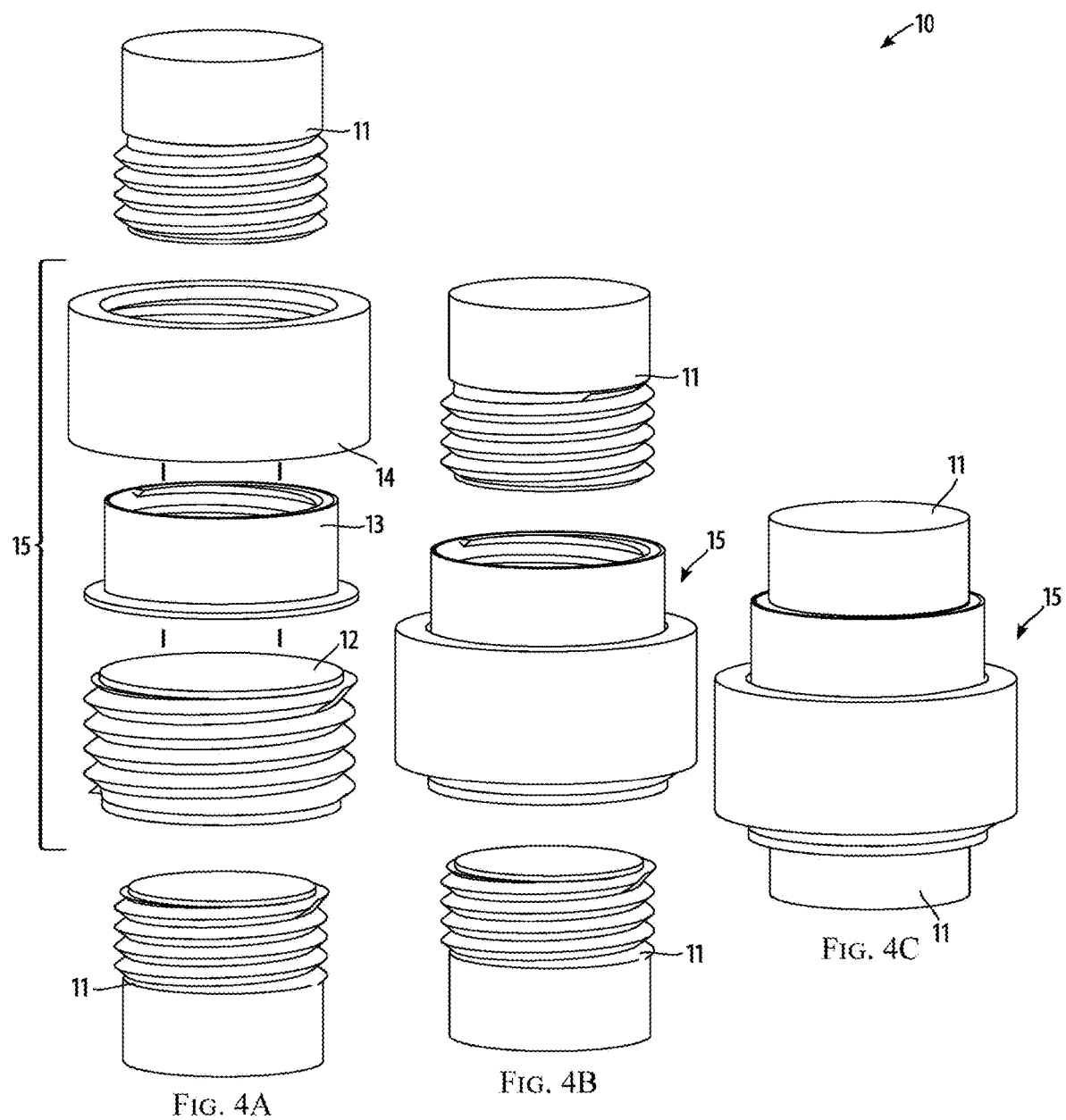
FIG. 4 illustrates exploded and assembled views of an embodiment of the tactical-gear interconnection system.
Figures 5, 5A, 5B, 5C:
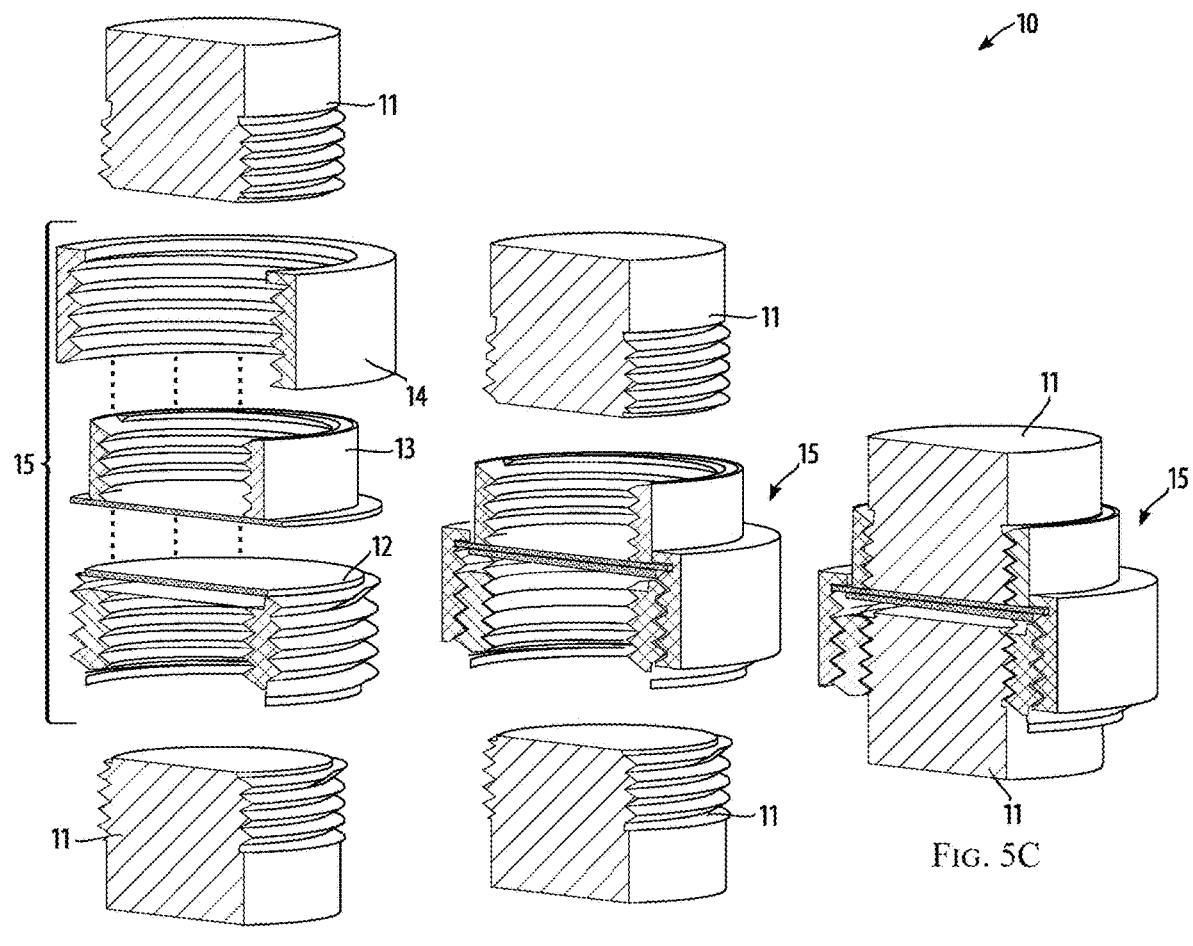
FIG. 5 illustrates partial-cutaway exploded and assembled views of an embodiment of the tactical-gear interconnection system.
FIG. 5A illustrates an exploded view of the tactical-gear interconnection system.
FIG. 5B illustrates a partially assembled view of the tactical-gear interconnection system.
FIG. 5C illustrates an assembled view of the tactical-gear interconnection system.

Referring now to FIG. 4 & FIG. 5, the component parts are shown in detail disassembled, partially assembled, and assembled. The three components of the union 15 are the internal-external threaded section 12, the internal-only threaded section 13, and the internally threaded collar 14.

The internal-external threaded section 12 has internal threads defining a socket sized to accommodate any plug unit 11, at the open end, and external threads defining a larger plug sized to accommodate the larger socket formed by the internally threaded collar 14. Opposite the open end of the internal-external threaded section 12 is a closed end having a flat surface.

The internal-only threaded section 13 has internal threads defining a socket sized to accommodate any plug unit 11, at the open end, as with the internal socket in the internal-external threaded section 12. The opposite, closed end of the internal-only threaded section 13 has a flat surface which extends beyond the external diameter of the body of the section.

In use, the flat surface at the closed end of the internal-external threaded section 12 is brought together with the flat surface at the closed end of the internal-only threaded section 13. Therefore, in use, the flat surfaces are face-to-face and the open-end sockets are in a 180-degree relationship, except in embodiments intended to make an angled connection. This joining of the flat surfaces provides the benefit of stabilizing the connection against flexing, bending forces along the line of the connection. Because the strain of the bending forces is resisted primarily by the face-to-face flat surfaces, this strain is not applied to the threaded surfaces of the plugs and sockets. Therefore, the primary strain applied to the threaded surfaces of the plugs and sockets is the essentially constant strain of holding the connection together, and not the highly variable bending strains applied to the connection in use in the field.

The internally threaded collar 14 has two open ends, with one end defining a socket sized to accommodate the larger plug defined by the external threads of the internal-external threaded section 12. The opposite end is open enough to accommodate the external diameter of the body of the internal-only threaded section 13, with a circumferential ledge or inward projection sized to make contact with the flat surface which extends beyond the external diameter of the body of the internal-only threaded section 13. Therefore, the internally threaded collar 14 pushes the internal-only threaded section 13 nominally downward while at the same time pulling the internal-external threaded section 12 nominally upward, causing the two flat surfaces to be pressed together face to face, and making the secure removable connection between the two plug units 11 and the gear to which each is attached.

Figure 6:
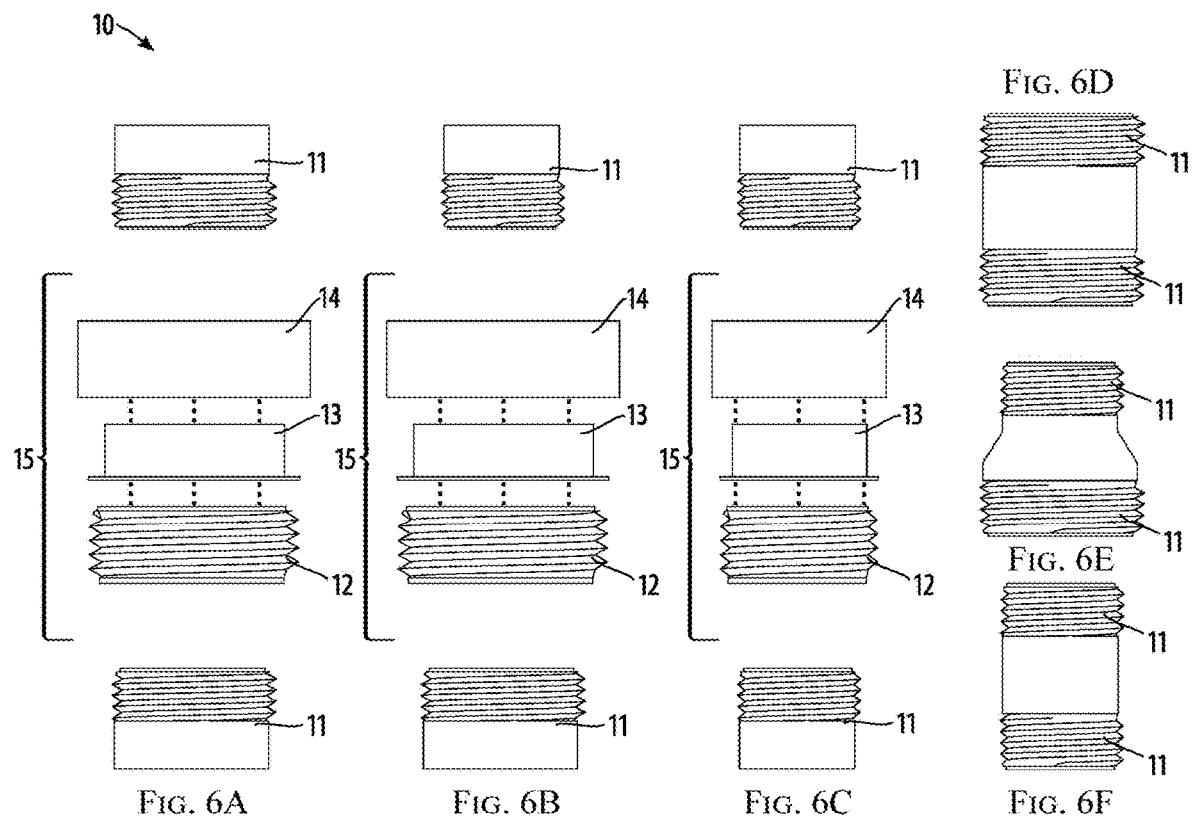
FIG. 6 illustrates exemplary embodiments of the tactical-gear interconnection system having different sizes and the interconnections among such different sizes.

FIG. 6 illustrates embodiments of plug units 11 of different sizes (FIG. 6B), unions 15 accommodating different sizes (FIGS. 6B, 6C), and double-ended plugs adapter units 11 of different sizes (FIGS. 6D, 6E, and 6F). If an embodiment of the tactical-gear interconnection system needs to provide a choice of different-sized plug units 11, perhaps to accommodate large differences in the sizes of the tactical gear, the unions 15 can be made to connect the different-sized plug units 11. All of the unions 15, by design, are socket-to-socket connectors, as described above. Plug-to-plug adapters, of same-sized plug units 11 or different-sized plug units 11, as shown in FIGS. 6D-6F, can be provided in order to expand the available connection options. For example, it may be understood that a plug-to-plug adapter, as pictured in FIGS. 6D, 6E, and 6F, featuring a first adapter plug unit on one end of the plug-to-plug adapter, and a second adapter plug unit on essentially the opposite end of the plug-to-plug adapter, allows the user to provide a supplemental removable connection between two pieces of tactical gear. For example, as shown in FIG. 6E, which provides a plug-to-plug adapter with a first adapter plug unit of a different since than the second adapter plug unit, the user would have the option of using the plug-to-plug adapter to provide a removable connection between two differently-sized pieces of tactical gear.

A plug-unit size of approximately 1-inch diameter is appropriate to supply sufficient support for moderately large technical gear but not unreasonably large for smaller gear.

Suitable materials for making the tactical-gear interconnection system apparatus 10 are essentially the same range of materials used to manufacture tactical gear, which is machinable metals, composite materials, and hard plastics. Different components can be made of different materials. If it is desired to make an electrically conductive connection between two conductive pieces of gear, then electrically conductive material should be used to construct the union 15. On the other hand, two pieces of gear can be electrically isolated from each other with a union 15 constructive of non-conductive material.

The simplicity and interchangeability of the tactical-gear interconnection system provides benefits in the field. A spare union 15 can be carried or can be borrowed from other gear. No tool is needed to make and unmake connections. Connection and disconnection can be accomplished blindfolded in training and under challenging conditions in the field. Unusual configurations of tactical gear can be made in the field, without tools, in order to meet unusual circumstances.

Many changes and modifications can be made in the present invention without departing from the spirit thereof. I therefore pray that my rights to the present invention be limited only by the scope of the appended claims.

I claim:
1. A tactical-gear interconnection system apparatus for removably connecting a variety of pieces of tactical-gear comprising:

(i) a plurality of plug units of the same size, affixed to tactical gear;

(ii) a union having two sockets of the same size as said plug units, said union comprising:

(a) an internal-external threaded section, said internal-external threaded section having an interior surface and an exterior surface, having internal threads extending substantially along the entire interior surface and external threads extending substantially along the entire exterior surface, an open end, defining a socket sized to accommodate any said plug unit, and a closed end having a flag surface, the exterior surface of the internal-external threaded section defining a larger plug having a larger diameter;

(b) an internal-only threaded section having internal threads and an open end, defining a socket sized to accommodate any said plug unit, having an external body surface not larger than the larger diameter of said internal-external threaded section, and having a closed end having a flat surface extending beyond the external body surface and having a diameter larger than the larger diameter of said internal-external threaded section; and (c) an internally threaded collar having internal threads and a first open end defining a larger socket sized to accommodate the larger plug of said internal-external threaded section, and a second open end having a central opening of the same size as the larger diameter of said internal-external threaded section, and a circumferential solid projection adapted to make contact with the flat surface extending beyond the external body surface of said internal-only threaded section; and (iii) an adapter element, said adapter element having a first adapter plug unit and a second adapter plug unit, said first and second adapter plug units featured on opposite ends of said adapter element, where, in use, said adapter element provides a supplemental removable connection between two pieces of tactical gear;

where, in use, said internally threaded collar pushes said internal-only threaded section nominally downward while at the same time pulling said internal-external threaded section nominally upward, causing the two flat surfaces to be pressed together face to face; and where two pieces of tactical gear affixed one each to said plug units, when connected to the respective socket of said internal-external threaded section and said internal-only threaded section, removably connect one piece of tactical gear to the other.

2. A tactical-gear interconnection system method for removably connecting a variety of pieces of tactical gear, comprising:

(i) providing a tactical-gear interconnection system apparatus, comprising:

(a) a plurality of plug units of the same size, affixed to tactical gear;

(b) a union having two sockets of the same size as said plug units, said union comprising:

(1) an internal-external threaded section, said internal-external threaded section having an interior surface and an exterior surface, having internal threads extending substantially along the entire interior surface and external threads extending substantially along the entire exterior surface, an open end, defining a socket sized to accommodate any said plug unit, and a closed end having a flat surface, the exterior surface of the internal-external threaded section defining a larger plug having a larger diameter;

(2) an internal-only threaded section having internal threads and an open end, defining a socket sized to accommodate any said plug unit, having an external body surface not larger than the larger diameter of said internal-external threaded section, and having a closed end having a flat surface extending beyond the external body surface and having a diameter larger than the larger diameter of said internal-external threaded section; and (3) an internally threaded collar having internal threads and a first open end defining a larger socket sized to accommodate the larger plug of said internal-external threaded section, and a second open end having a central opening of the same size as the larger diameter of said internal-external threaded section, and a circumferential solid projection adapted to make contact with the flat surface extending beyond the external body surface of said internal-only threaded section; and (c) an adapter element, said adapter element having a first adapter plug unit and a second adapter plug unit, said first and second adapter plug units featured on opposite ends of said adapter element, where, in use, said adapter element provides a supplemental removable connection between two pieces of tactical gear;

where, in use, said internally threaded collar pushes said internal-only threaded section nominally downward while at the same time pulling said internal-external threaded section nominally upward, causing the two flat surfaces to be pressed together face to face; and where two pieces of tactical gear affixed one each to said plug units, when connected to the respective socket of said internal-external threaded section and said internal-only threaded section, removably connect one piece of tactical gear to the other; and (ii) using said tactical-gear interconnection system apparatus for removably connecting a variety of pieces of tactical gear.

\* \* \* \* \*